Dec. 26, 1950  A. LEACH ET AL  2,535,299
TIRE TRACTION COVER
Filed Sept. 26, 1947

Inventors
Albert Leach
James Leach
by Douglas S. Johnson
Agent

Patented Dec. 26, 1950

2,535,299

UNITED STATES PATENT OFFICE 2,535,299

TIRE TRACTION COVER

Albert Leach, Guelph, and James Leach,
Hamilton, Ontario, Canada

Application September 26, 1947, Serial No. 776,388

3 Claims. (Cl. 152—186)

This invention relates to traction covers or caps for pneumatic tires or the like and the principal object of the invention is to provide a very sturdy and inexpensive traction cover which will be extremely easy to apply or to remove from a tire and which will, when in tire-engaging relation, effectively grip the surface over which the vehicle is travelling to provide very positive traction under the most extreme conditions of ice and snow or mud.

A further and important object is to provide a readily fabricated tire traction cover in which strain applied to one portion thereof will be distributed throughout the cover to eliminate local wear and to increase the life of the cover indefinitely.

A still further and important object is to provide a traction cover which will function effectively without in any way damaging the tire which it surrounds.

A further object is to provide a tire traction cover which will effectively prevent lateral slipping of the tire.

The principal feature of the invention consists in providing a tire traction cover or casing comprising a flexible band adapted to be securely applied to the periphery or tread of a tire and having traction studs secured therein and extending outwardly therefrom, and providing means arranged on the inner side of the band for connecting the inner ends of the studs to transmit strain applied to the individual stud and dissipate same over a large area, relieving the wear on the band and preventing tearing thereof.

A further and important feature consists in forming the band in two half segments to facilitate application to the tire and providing the segments with adjustable means for drawing and holding the segments in firm tire-engaging relation.

A still further and important feature consists in providing the band with shoulder projections arranged around the edges thereof to increase the traction effect and resist lateral skidding of the tire.

A still further feature consists in utilizing spike members as the traction studs and removably mounting these spike members in the band so that they can be replaced if necessary.

Referring to the accompanying drawings.

Figures 1, 2, 3, 4:
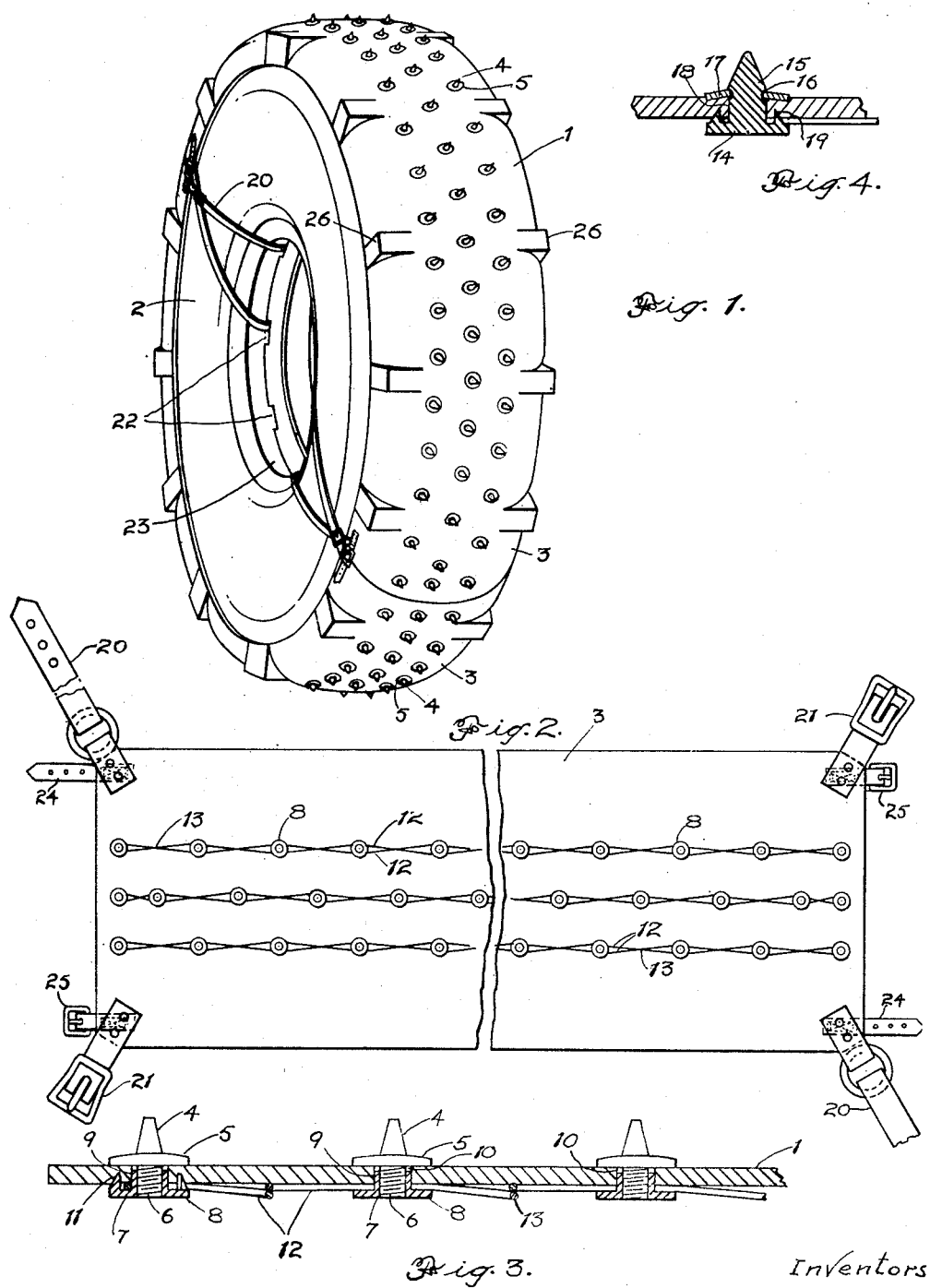
Figure 1 is a perspective view of a tire to which my traction cover has been applied.
Figure 2 is a plan view of the underside of one of the half segments of the cover illustrated in Figure 1.
Figure 3 is a longitudinal sectional view through a portion of one of the cover segments illustrating the manner in which the traction studs are retained in the cover showing the novel manner of inter-connecting these studs to dissipate the strain applied thereto.
Figure 4 is a section through a portion of the cover similar to Figure 3 but illustrating an alternative form of traction stud.

Various forms of traction devices for tires have been proposed. These inherently have had the disadvantage of being expensive to manufacture and very difficult to apply to the tire. In many instances all metal structures have been proposed which quickly destroy the tire and provide a very rough ride for the occupants of the vehicle to which the tire is attached.

Fabric traction covers have not previously been successfully used because the intense local strains produced in obtaining the traction effect rapidly ruptured and destroyed the fabric material.

The present invention has been devised to overcome the above difficulties by providing a readily applied tire traction cover which will have the required flexibility and yet will adequately withstand the severe stresses applied thereto.

In addition the tire cover of the present invention will act as an effective protection for the tire to which it is applied, preventing the penetration of the tire by sharp pieces of material or objects lying on the roadway.

With reference to the accompanying drawings, the traction cover comprises a flexible band 1 adapted to be applied to the periphery of a tire 2 over the tread thereof and formed in two half sections or segments 3 adapted to be coupled together to encompass the tire.

The cover or band 1 is preferably formed of multi-ply fabric but any suitable fabric or rubber, or plastic, or fabric impregnated with rubber, may be utilized. The width of the cover is somewhat greater than the width of the tire tread so that the edges thereof will extend over the edges of the tire tread and cover a portion of the tire sidewall to increase the gripping effect between the tire and cover and to eliminate the possibility of the cover being dislodged by a lateral movement of the tire.

Secured to the flexible band or cover 1 in spaced relation are a plurality of studs 4 which, as shown in Fig. 3, are in the form of a spike having an enlarged circular base portion or locking shoulder 5 from which extends a threaded extension 6 adapted to engage an eyelet or nut 7 formed with an enlarged base 8 adapted to contact the inner face of the flexible cover and having an internally threaded annular extension 9 extending through the opening 10 provided in the cover.

The enlarged base 8 of these eyelets 7 is preferably formed with a plurality of upstanding sharpened locking dogs 11 which bite into the fabric or material forming the cover to hold the eyelet against rotation.

It will be understood that the spike portion of the stud 4 will be threaded down into the eyelet 7 until the circular base portion or locking shoulder 5 thereof is in firm engagement with the outer surface of the cover. To this end it will be noted that the eyelet extension 9 does not extend completely through the material forming the cover.

Each of the half segments 3 of the cover are shown provided with a plurality of rows of studs 4 arranged adjacent the central portion thereof, the studs of adjacent longitudinal rows being staggered to enhance the traction effect obtained thereby.

To prevent the strain from being applied directly from the studs to the fabric, the studs of each row are shown connected by pairs of wires 12 which extend underneath the base portions 8 of the eyelets 7 and they are firmly clamped thereby to the inner face of the flexible cover 1.

The wires are crossed as at 13 between the adjacent studs to facilitate the maintenance of the wires beneath the enlarged bases 8 of the eyelets and to hold same in engagement with the periphery of the eyelet extensions 9. The provision of the locking dogs 11 also serves to prevent displacement of the wires 12 from beneath the eyelet bases 8.

The modified form of traction stud shown in Figure 4 eliminates the necessity of threading the spike portion into the eyelet 7 and comprises a base 14 having an upstanding spike projection 15 formed with an annular groove 16 adjacent the upper end.

In applying this latter form of stud to the cover segments 3 the spike portion 15 is projected through one of the openings 10 in the cover with the base 14 adjacent the inner cover face and with the wires 12 located between the cover and the base.

Next a washer disc 17 of suitable resilient material, having an opening 18 therethrough of a diameter slightly smaller than the diameter of the shank of the spike portion 15, is pushed onto the spike under pressure or force. The resiliency of the washer 17 permits it to deform sufficiently to receive the shank of the spike 15 but upon reaching the groove 16 it will snap back into shape and engage the walls of the groove, being permanently locked against removal therefrom and forming a locking shoulder on the spike.

The outer edge of the washer 17 when applied to the spike 15 resiliently grips the outer face of the cover and serves to compress the cover material against the stud base 14 which preferably is provided with locking dogs 19 adapted to penetrate and grip the inner face of the cover segment. Again these dogs 19 serve to prevent displacement of the wires 12 from beneath the stud base 14.

It will be understood of course that other forms of resilient deformable cap structures may be utilized with the grooved spike 15 in place of the washer 17 to securely lock the stud to the cover segment.

It will be readily understood that the provision of the cross-over pairs of wires 12 will not only materially reinforce the cover 1 but will serve to effectively transmit strain applied to one of the studs over a considerable area of the cover and will prevent the stud under strain from tearing the material forming the cover and pulling free.

The wires 12 therefore permit a relatively thin cover to be used, effectively reducing the cost and increasing the facility with which the cover may be handled in applying to or removing from a tire.

The preferred arrangement for inter-connecting the studs 4 is by the use of the wires 12. It will be understood of course that suitable metal bands having holes punched therein to receive the annular extensions 9 of the eyelet 7 or to receive the spike portions 15 could be utilized in place of the wires 12.

The half segments 3 which combine to form the complete tire cover or casing are substantially equal in length to one half the circumferential perimeter of the tire and secured to the sections adjacent the end thereof are suitable straps 20 and buckles 21. These straps and buckles are preferably arranged angularly of the segments and the straps 20 are adapted to extend through slots 22 provided in the wheel 23 on which the tire is mounted and when connected with the buckles 21 serve to effectively hold the segments to the tread of the tire and to prevent movement of the segments peripherally on the tire.

Suitable additional straps and buckles 24 and 25 respectively may be secured to the ends of the segments 3 to permit the segments to be drawn into firm engagement with the tire and to hold the adjoining segment edges together and flat against the tire tread.

Other suitable fastening means could of course be utilized for coupling the segments in tire-gripping relation.

In the cover shown in Figure 1 each of the segments 3 is provided with a plurality of projections or shoulders 26 which extend outwardly from adjacent the outer row of studs 4 to the edge of the segment with the thickness of the shoulder increasing progressively towards the segment edge.

These shoulders 26 are preferably arranged in spaced pairs and define squared corners when the segment 3 is in tire-engaging relation. This arrangement of the shoulders 26 serves to maintain the tire on a definite well defined track by resisting any side or lateral movement of the tire when the wheel on which it is secured is rotated. These shoulders 16 also serve as a reinforcement to prevent wear or a breaking down of the edge of the tire tread and to increase the width over which traction is provided, effectively increasing the width of the tire.

In applying the cover to the tire one of the segments is slipped over the surface of the tire which is then rolled a short distance until the segment is arranged on the underside thereof. The second half or segment is then placed over the top of the tire and fastened in position with the buckle and strap arrangement permitting the segments to be drawn into tight engagement with the tire tread.

From the foregoing it will be seen that a traction cover such as described can be very quickly and easily applied to the tire and will provide a very effective traction between the vehicle and the surface over which it is travelling.

In addition, not only will the cover provide a very positive traction effect but it will effectively serve to protect the tire itself against the penetration of sharp foreign material.

It will also be understood that the provision of the inter-connecting wires 12 fixed to the bases of the traction studs 4, which may be either of the types shown in Figures 3 and 4, will materially reinforce the cover and extend the life of the cover indefinitely.

When studs of the type shown in Figure 4 are used the washers 17 can be applied to the spike portions 15 by means of a suitable press, thus facilitating the assembly of the cover unit.

A traction cover such as described will not only prove extremely effective but its importance is further enhanced in the fact that it can be readily produced and the pointed or spiked ends of the studs will present an extremely small area with which their penetration into a surface may be resisted, thus ensuring that the weight of the vehicle will force the studs firmly into the surface to be gripped.

What we claim as our invention is:

1. A tire traction cover comprising a flexible band formed in two sections adapted to be applied to a tire over the tread thereof, a plurality of studs of spike formation extending through said sections and having enlarged bases arranged against the inner faces of the sections, said studs being formed with an annular groove adjacent the outer end, resilient deformable washers having central openings of a normal diameter smaller than the diameter of said studs, said washers being mounted on said studs and engaged in locking relation in the annular grooves thereof and contacting the outer faces of said sections, and reinforcing means separate from the material forming said band running lengthwise of said sections and clamped between said enlarged stud bases and the inner faces of said sections to interconnect said studs in rows.

2. A device as claimed in claim 1 in which upstanding locking dogs are provided on the enlarged bases of said studs.

3. A tire traction cover comprising a flexible band formed in a plurality of sections adapted to be applied to a tire over the tread thereof, means secured to said sections for holding same in tire-engaging relation, a plurality of studs extending through each of said sections each stud having an enlarged base arranged against the inner face and a locking shoulder arranged against the outer face of its section, and reinforcing means separate from the material of said band running lengthwise of said sections and clamped between said enlarged stud bases and the inner faces of said sections to interconnect said studs in rows extending lengthwise around the tire to transmit strain applied to individual studs in the direction of the strain around the tire.

ALBERT LEACH.
JAMES LEACH.

REFERENCES CITED

The following references are of record in the file of this patent:

UNITED STATES PATENTS

| Number | Name | Date |
| --- | --- | --- |
| 609,319 | Adams | Aug. 16, 1898 |
| 2,130,524 | Clark | Sept. 20, 1938 |
| 2,348,256 | Hollis | May 9, 1944 |
| 2,426,974 | Ragon | Sept. 2, 1947 |
| 2,473,249 | Hershman | June 14, 1949 |

FOREIGN PATENTS

| Number | Country | Date |
| --- | --- | --- |
| 83,057 | Sweden | Apr. 2, 1935 |